United States Patent [19]

Scheibelhoffer et al.

[11] Patent Number: 5,122,569
[45] Date of Patent: Jun. 16, 1992

[54] TOUGHENED COMPOSITIONS OF POLYAMIDE AND FUNCTIONALIZED RUBBER BLOCK OR GRAFT COPOLYMERS

[75] Inventors: Anthony S. Scheibelhoffer, Norton; Parviz Baghaii, Independence, both of Ohio

[73] Assignee: Ferro Corporation, Cleveland, Ohio

[21] Appl. No.: 670,370

[22] Filed: Mar. 14, 1991

Related U.S. Application Data

[63] Continuation of Ser. No. 288,736, Dec. 22, 1988, abandoned.

[51] Int. Cl.[5] .................. C08L 51/04; C08L 77/06; C08L 77/10
[52] U.S. Cl. ........................... 525/66; 525/92; 525/179
[58] Field of Search ............... 525/92, 66, 179

[56] References Cited

U.S. PATENT DOCUMENTS

| | | |
|---|---|---|
| 3,373,222 | 3/1968 | Armstrong . |
| 3,373,223 | 3/1968 | Armstrong . |
| 3,676,400 | 7/1972 | Kohan . |
| 3,845,163 | 10/1974 | Murch . |
| 4,105,709 | 8/1978 | Iwami et al. . |
| 4,148,846 | 4/1979 | Owens et al. . |
| 4,167,505 | 9/1979 | Dunkelberger . |
| 4,174,358 | 11/1979 | Epstein . |
| 4,314,929 | 2/1982 | Mahoney, Jr. . |
| 4,321,337 | 3/1982 | Smith . |
| 4,346,194 | 8/1982 | Roura . |
| 4,506,056 | 3/1985 | Gaylord .............. 524/531 |
| 4,745,157 | 5/1988 | Yates, III et al. ............ 525/92 |

FOREIGN PATENT DOCUMENTS

| | | |
|---|---|---|
| 0072480 | 2/1983 | European Pat. Off. ............ 525/179 |
| 62-74943 | 4/1987 | Japan .................. 525/179 |
| 0998439 | 7/1965 | United Kingdom . |
| 998439 | 7/1965 | United Kingdom . |
| 1279836 | 6/1972 | United Kingdom . |
| 2194541 | 3/1988 | United Kingdom . |

*Primary Examiner*—Melvyn I. Marquis
*Assistant Examiner*—Vasu S. Jagannathan
*Attorney, Agent, or Firm*—Daniel J. Hudak Co.

[57] ABSTRACT

A thermoplastic multiphase composition is provided which is a melt blend of a functionalized block or graft copolymer and a polyamide. The blend is made from polymers. That is, an elastomeric polymer is blended with a reactive polymer having a functionality which is reactive with the polyamide. This blending occurs under conditions, such as in the presence of free radicals, which lead to the coupling of the elastomeric polymer and the reactive polymer and forms a block or graft copolymer. The graft or block copolymer is then blended with a polyamide. The composition is a multiphase composition wherein the polyamide is generally a continuous phase, and the block or graft copolymer is present in the form of a particulate dispersed phase. The polyamide compositions have a wide range of improved properties such as good low temperature (e.g., minus 40° C.) impact resistance and good high temperature heat deflection (e.g., 65° C.).

16 Claims, No Drawings

TOUGHENED COMPOSITIONS OF POLYAMIDE AND FUNCTIONALIZED RUBBER BLOCK OR GRAFT COPOLYMERS

This application is a continuation of application Ser. No. 07/288,736, filed on Dec. 22, 1988, by Anthony S. Scheibelhoffer et al, for TOUTHENED COMPOSITIONS OF POLYAMIDE AND FUNCTIONALIZED RUBBER BLOCK OR GRAFT COPOLYMERS now abandoned.

FIELD OF THE INVENTION

This invention generally relates to thermoplastic polyamide compositions, particularly nylon blended with functionalized rubber block or graft copolymers to form a multiphase blend. Specifically, the polyamide compositions of the present invention demonstrate improved notched Izod values (i.e., ductility), both at room temperature and at low temperatures (e.g., minus 40° C.), as well as good high temperature properties such as heat deflection. The invention further relates to the processes for preparing these compositions.

BACKGROUND

Unmodified thermoplastic polyamides, particularly nylons, are generally regarded as "tough" resins. These polymers have good elongation, high energy at break, high tensile impact strength and high energy absorption. Polyamides, however, are deficient with respect to resistance to crack propagation, as reflected in notch sensitivity, brittle breaks and occasional catastrophic failure of molded or extruded parts. The tendency of polyamides to break in a brittle manner limits their utility. On the other hand, prior thermoplastic elastomer systems are known which solve some of the deficiencies noted for polyamides. However, such systems have limitations with regard to properties such as heat distortion or flexural modulus.

Much effort has been given to improving this deficiency of polyamides in general. For example, U.S. Pat. No. 4,174,358 discloses a toughened multi-phase thermoplastic polyamide composition. This patent discloses admixing at least one thermoplastic polymer with a polyamide. The thermoplastic polymer has a particle size of 0.01 to 3.0 microns and a tensile modulus of no greater than 20,000 psi. The polymer is derived from one or more monomers which are copolymerized. The patent does not disclose improved low temperature toughness as measured by low temperature notched Izod testing.

The prior art has evidenced this effort of improving impact strength of polyamides by admixing a wide variety of additives with polyamides. Some improvement in toughness has been obtained by these various additives, however, none has demonstrated significant improvement in low temperature toughness along with high impact strength without significant loss of heat deflection temperature. For example, British Patent No. 998,439 discloses a thermoplastic composition comprising a mixture of 50 to 99 percent linear polyamide and 1 to 50 percent of an olefin copolymer, the olefin copolymer containing from 0.1 to 10 mole percent of acid groups.

British Patent No. 1,279,836 discloses synthetic hair derived from polyamides and highly crosslinked copolymers which are derived from a monoethylenically unsaturated monomer and a di- or tri- ethylenically unsaturated crosslinking agent. The particle size of these crosslinked copolymers are preferably 1 micron or less.

U.S. Pat. No. 4,321,337 discloses coextruding an ionomer resin with a polyamide.

U.S. Pat. Nos. 3,373,222 and 3,373,223 disclose admixing a polyolefin and a carboxylated polyethylene with a linear polyamide. There is no disclosure relating to the particle size of the polymers added, nor to the additive polymers being made from two or more polymers.

U.S. Pat. No. 3,845,163 discloses blends of 60 to 85 percent by weight polyamide and an acid containing olefin polymer in which the acid is derived from an alpha, beta ethylenically unsaturated carboxylic acid and in which at least 10 percent of the acid groups have been neutralized with metal ions to form ionomers. This patent, however, is directed to improving weldline toughness which is not specifically related to blend toughness.

U.S. Pat. No. 4,148,846 discloses a combination of an amine reactive moiety containing polymer grafted to a polycarbonamide. This patent is directed to improving the extrudability, blow moldability and injection moldability of polyamides. While the patent does disclose improved impact strength, there is no disclosure relating to low temperature toughness. This patent discloses achieving its objectives by employing a modifier that comprises a first phase elastomeric polymer combined with a final rigid thermoplastic polymeric phase containing amine reactive moieties which are grafted to the polyamide.

U.S. Pat. No. 3,676,400 discloses polyamides having improved impact strength by blending 10 to 50 weight percent of an olefin polymer containing 1 to 10 mole percent of groups from an unsaturated carboxylic acid with 50 to 90 weight percent of a polyamide having a molecular weight of at least 10,000. This patent requires employing a polyamide having a high content of amine end groups.

U.S. Pat. Nos. 4,314,929 and 4,105,709 disclose various filled polyamide compositions which also include impact modifiers.

U.S. Pat. No. 4,167,505 discloses an impact modifier for polyamides which is produced by first forming an impact modifier concentrate of an acrylic impact modifier combined with a high molecular weight aliphatic polycarbonamide followed by mixing 10 to 30 parts by weight of the concentrate with 70 to 90 parts by weight of a low molecular weight aliphatic polycarbonamide.

None of the foregoing disclosures are with, nor demonstrate, improved low temperature toughness for polyamides in general and particularly nylon type polyamides, neither have they provided any information regarding heat deflection temperatures.

SUMMARY OF THE INVENTION

In accordance with the present invention, a multiphase polymer system is provided wherein the reactive block or graft copolymer can be located in a discontinuous phase along with the natural or synthetic rubber and the nylon matrix can be in a continuous phase. Alternatively, the continuous phase can be the elastomer and the dispersed phase can be the polyamide.

According to one embodiment of the present invention, an impact modifier for polyamides is provided which comprises a block or graft copolymer having reactive functionalities which are reactive with the polyamide. In a first step, a polymer having the reactive functionality is admixed with a natural or synthetic elastomer polymer in the presence of a free radical generator under high shear conditions to form a reactive block or graft copolymer which acts as an impact modifier and/or compatibilizing agent. In a second step, the impact modifier is added to the polyamide. In this embodiment, a high impact strength, multiphase thermoplastic polyamide composition is provided which also exhibits improved low temperature toughness. The impact modifiers of the present invention are easily prepared with conventional thermoplastic processing equipment and are inexpensive.

Further in accordance with the present invention, an additional rubber can be compatibilized with the polyamide through the reactive block or graft copolymer.

Still further in accordance with the present invention, an inexpensive process for preparing a multiphase polymer system having high impact strength, improved notched Izod both at room temperature and at low temperature (e.g., minus 40° C.) is provided, and heat deflection temperatures of greater than 50° C. at 264 psi for non-annealed samples. The process encompasses the production of the impact modifier from polymers rather than from monomers. As a result, the process leads to increasing ease of processing, and safety.

Still further in accordance with the present invention, toughened thermoplastic compositions having improved chemical resistance are provided which are useful for preparing various melt processed articles including molded or extruded articles such as films, oriented fibers, bumpers, tubing, laminates, wire coatings, and gaskets. In general, the compositions can be used where high impact values are advantageous for wide temperature variations such as from minus 40° C. to 75° C.

Still further, in accordance with the present invention, it is an advantage that the blend composition of the present invention is made starting with polymers rather than with monomers. This eliminates the need for polymerization vessels and precautions typically associated with polymerization reactions starting from monomers.

These and other aspects of the present invention will become clear to those skilled in the art upon the reading and understanding of the specification.

DETAILED DESCRIPTION OF THE INVENTION

A multiphase polyamide/elastomer system has been developed which includes a continuous phase and a dispersed phase. The continuous phase can be either the polyamide or the elastomer depending on the respective concentrations. The multiphase composition will be termed a "blend" herein where the term is used to mean a physical amalgamation of two or more somewhat discrete components which exist in a multiphase system having phase interaction at some level. This interaction could include intermolecular forces such as Van der Waals forces or hydrogen bonding or could rise to the level of intermolecular bonding including ionic and/or covalent bonding.

The polyamide resins of the toughened blend compositions according to the present invention are known in the art and include semi-crystalline and amorphous resins which may also be referred to as nylon resins. Suitable polyamides include those described in, for example, U.S. Pat. Nos. 2,512,606 and 3,393,210. A suitable polyamide may be produced by condensation of approximately equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of such polyamides include polyhexamethylene adipamide (66 nylon), polyhexamethylene azelaamide (69 nylon), polyhexamethylene sebacamide (610 nylon), and polyhexamethylene dodecanoamide (612 nylon). Polyamides produced by ring opening of lactams include polycaprolactam, polylauric lactam, poly-11-aminoundecanoic acid, bis(-para-aminocyclohexyl) methane dodecanoamide and the like. It is also possible to use in this invention polyamides prepared by the copolymerization of two of the above monomers or terpolymerization of the above monomers or their components, e.g., for example, an adipic, isophthalic acid and hexamethylene diamine copolymer. The polyamides are preferably linear with a melting point in excess of 200° C. and having a weight average molecular weight of about 5,000 to about 50,000, and preferably from about 10,000 to about 30,000.

Broadly from about 5 to about 95 percent by weight of the polymers in the composition can be composed of one or more polyamides; however, preferred compositions contain from about 30 to about 85 percent, and more preferably from about 40 to about 80 percent, by weight of the polyamide.

The blend composition according to the present invention is produced by a two-step process. In the first step, an impact modifier comprising a graft or block copolymer is made by joining a natural or synthetic rubber and a polymer containing functionalities which are reactive with the polyamide. In the second step, the graft or block copolymer is added and mixed generally under shear conditions to the polyamide to form the multiphase system of the present invention.

The impact modifying polymers of the present invention are graft and/or block copolymers which are composed of a first polymer and a second polymer under conditions which result in the coupling of the two polymers through either chemical and/or physical bonding. This coupling can be achieved by various reactions between the first and second polymers such as condensation reaction, reaction with a third polymer, free radical addition, ion-ion interaction, and the like. A suitable example of such coupling is free radical addition. In this case, a first elastomer polymer is mixed with a second polymer containing functional groups therein in the presence of any conventional free radical initiator and/or under conditions such as shear and temperature, which generate free radicals in the system. The free radical activates one or both of the component polymers and results in a chemical coupling between them. In this manner, block or graft copolymers containing reactive functionalities therein are obtained. It is essential to achieve the advantages of the present invention that the first elastomer polymer and the second functional polymer are mixed in the presence of free radicals. If no free radicals are present, the desired notched Izod values of the polyamide compositions are not achieved. This coupling reaction of free radicals and the resultant addition of the two types of polymer is termed herein "block polymerization" or "graft polymerization," although the process is distinct from those processes generally known as polymerizations in that the process utilizes polymers rather than monomers as starting products. This is a significant advantage since it eliminates the need for customary polymerization vessels and precautions, such as precautions against volatiles and fire. It is further essential in the selection of the first and second polymers that at least one of these polymers is capable of forming free radicals on the backbone or the terminal group when subjected to free radicals and/or mechanical shear or heat, or both, and that the respective free radicals of the first or second polymers will bond together to form a block or graft copolymer. It is possible in addition that one of the polymers has a group which can react with the free radicals of the other polymers and that a coupling reaction subsequently occurs.

The elastomers of the present invention are generally rubbers, that is either have a low glass transition temperature "Tg," and/or a high elongation. Typically, rubbers are classified as polymers which have a glass transition temperature of minus 40° C. or less. Another classification for acceptable rubbers is that the elongation is generally 100 percent or greater at room temperature. Such rubbers are well known to the art as well as to the literature. A group of rubbers which can be utilized are those made from diene monomers having from 4 to 12 carbon atoms such as butadiene, isoprene, hexadiene, and the like, as well as interpolymers thereof such as butadiene-isoprene, butadiene-hexadiene, and the like. Another group of rubbers are those made from conjugated dienes having from 4 to 12 carbon atoms with vinyl substituted monomers having from 8 to 12 carbon atoms such as styrene, alpha-methylstyrene, and the like. A specific example is styrene-butadiene rubber. Yet another group of rubber compounds which can be utilized according to the present invention are rubbery type block copolymers made from the above-noted conjugated dienes having from 4 to 12 carbon atoms and the vinyl substituted aromatics having from 8 to 12 carbon atoms, with a specific example being a random copolymer or multiblock of styrene-butadiene or styrene-isoprene wherein the butadiene or isoprene has been partially or fully hydrogenated. Such rubbers are commercially available from Shell Chemical under the trademark "Kraton". The various nitrile rubbers constitute another group and are generally composed of an acrylonitrile or an alkyl derivative thereof with one or more conjugated dienes and optionally with one or more monomer units of an acrylic acid, an ester thereof, or a dicarboxylic acid. Various butyl rubbers, that is rubbers composed of isoprene and isobutylene monomer units, can also be utilized. Various ethylene-propylene copolymers can be utilized wherein the copolymer generally contains from about 60 to about 70 percent by weight of ethylene therein. Still another group of rubbers are the various terpolymers composed of ethylene-propylene-and small amounts of diene monomer units, such as ethyl norbornene, dicyclopentadiene, hexadiene, and the like. The amount of the diene monomer is generally from about one half to about 10 percent by weight. Various halogenated elastomers constitute yet another group of rubbers according to the present invention such as polychloroprene, that is polymers composed of 2-chloro-1,3-butadiene.

Preferably the elastomer is composed of ethylene-propylene-diene monomer units (EPDM); random copolymer or multiblock SBR; polyisoprene; or nitrile rubber. Most preferably the elastomer is an EPDM elastomer.

The amount of the first polymer present in the graft or block copolymer is from about 40 percent to about 90 percent by weight, and preferably from about 50 to 90 percent by weight based upon the total weight of the first and second polymers.

The second or reactive polymer is a polymer having at least one reactive functionality therein where the polymer is capable of forming a free radical segment along its backbone and/or at a terminal position, which segment will react with the first polymer or a segment thereof. Alternatively, the first polymer may form a free radical segment capable of reacting with the second polymer. It is also preferable that the reactive polymer has one or more vinyl repeating groups therein. It is preferable that the second polymer is comprised of an ethylenically unsaturated monomer such as a diene having from 4 to 10 carbon atoms or an olefin having from 5 to 18 carbon atoms; and most preferably the second polymer is an ethylene or ethylene-propylene copolymer or terpolymer. These polymers are modified with a mole fraction of from 0 or 0.01 to 0.5 of an alpha, beta unsaturated dicarboxylic acid or salt thereof having from 3 to 8 carbon atoms and preferably 3 or 4 carbon atoms, an alpha, beta unsaturated carboxylic acid or salt thereof having from 3 to 8 carbon atoms and preferably 3 or 4 carbon atoms, an anhydride or salt thereof having from 3 to 8 carbon atoms and preferably 3 or 4 carbon atoms, a monoester or salts thereof having from 3 to 8 carbon atoms and preferably 3 or 4 carbon atoms, a sulphonic acid or a salt thereof, an unsaturated epoxy compound having from 4 to 11 carbon atoms and preferably 4 to 6 carbon atoms, and combinations thereof. Most preferably the reactive functionality is an alpha, beta unsaturated dicarboxylic acid having from 3 to 4 carbon atoms, or an anhydride thereof or a metallic acid salt of the same. Examples of such functionalities include maleic anhydride, fumaric acid, maleic acid, methacrylic acid, acrylic acid, and glycidyl methacrylate. Preferable metallic acid salts are the alkaline metal and transitional metal salts, and most preferably sodium, zinc, and aluminum salts.

Suitable reactive polymers include ethyleneacrylic ester-methacrylic acid terpolymer, ethyleneacrylic ester-maleic anhydride terpolymer, ethyleneacrylic acid copolymer and ethylene-methacrylic acidmethacrylic acid alkaline metal salt (ionomer) terpolymers.

The first and second polymers are combined by mixing in the presence of free radicals. These free radicals can be generated by thermal or mechanical means or by the use of free radical generators. It is preferable in order to maximize the efficiency of the process that free radical generators and shear and/or heat are used together. Suitably free radical generators include initiators such as an alkanoyl, aroyl, alkaroyl, or an aralkanoyl diperoxide, a monohydroperoxide, or an azo compound, a persulfate, a peroxy ester, a percarbonate, or any other suitable free radical-type generator. Examples of specific generators include benzoyl peroxide, lauryl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, t-butyl peroxyneodecanoate, dinormal propyl peroxydicarbonate, azo-bisisobutyronitrile, alpha, alpha'-azodiisobutyrate, 2,2'-azo-bis-(2,4-dimethyl valeronitrile), and the like. The free radical generators should be added in an amount of from about 0.001 to about 1.0 percent by weight, and preferably from about 0.02 to about 0.5 percent by weight based on the total weight of the first and second polymer. Suitable free radical generators could also include high energy radiation. It is preferable that at least about 2 percent block or graft copolymerization occurs.

The block or graft copolymerization process generally occurs under heat, or under mechanical shear, or both. Desirably, as discussed, this is also conducted in the presence of the above-noted free radical initiators. Suitable reaction temperatures generally include from about 200° to about 500° F., with from about 300° to about 500° F. being preferred. The exact temperature will depend on the melt temperature and viscosity characteristics of the first and second polymers. The initiator will be selected to have a suitable half-life at the processing temperature in order that the free radicals generated are available during processing but do not remain in excess thereafter. Similarly, the residence time will be selected to provide sufficient time for the reaction to occur and to exhaust the initiator. The process can be conducted in any processing equipment that will meet the above requirements and produce sufficient shear to achieve intimate mixing of the ingredients. Thus, it is envisioned that batch or continuous processing can be used, although continuous processing is preferred. Suitable shear rate ranges are from about 500 sec$^{-1}$ to about 2,000 sec$^{-1}$, and more preferably from about 1,000 sec$^{-1}$ to about 1,500 sec$^{-1}$. Examples of suitable high shear equipment include twin screw extruders, Banbury mixers, Buss kneaders, FCM, and the like.

In the second step of the process of the invention, the graft or block copolymers are admixed with one or more polyamides.

The blend compositions of this invention may be prepared by melt blending one or more polyamides and one or more of the block or graft copolymers of the invention, to form a uniform mixture. Examples of suitable melt mixing equipment include extruders such as single or twin screw extruders, or other conventional plasticating devices such as a Brabender, Banbury, two-roll mill, or the like. Alternatively, the blends may be made by blending or by dry mixing together of the components followed by melt mixing of the dry mixture by extrusion or injection molding.

More specifically, the compositions may be prepared with a twin screw extruder. The constituents are dry blended and extruded under vacuum to remove volatiles at from 5° to 200° F. above the melting point of the matrix resin, and preferably at temperatures of from about 400° F. to about 650° F. for typical nylons. A processing residence time of not less than 40 seconds, and preferably 60 to 100 seconds is used. The extrudate, which is opaque at temperatures less than 20° C. above the melting point denoting a two-phase system, is cooled in a water bath, cut, dried and molded into test pieces. Of course, many process variations are possible, for example higher temperatures have been used successfully.

The notched Izod test characterizes the composition with regard to its ductility. Expressed in ft-lbs/inch of notch, notched Izod values in the dry as molded condition for preferred polymers are presented herein for testing conducted at room temperature (approximately 23° C.) and at minus 40° C. It has been found generally that dry as molded notched Izod ASTM D-256-86 values of at least 2 ft-lbs/inch, preferably 4 ft-lbs/inch, and most preferably 9 ft-lbs/inch, can be achieved.

The blend compositions in accordance with the invention have favorable heat deflection characteristics specifically greater than 50° C. and preferably from about 60° to about 75° C., and most preferably from about 65° to about 75° C. at 264 psi for non-annealed samples when measured in accordance with ASTM Test D648-82.

The melt flow of the thermoplastic composition is in the range of 0.02 to 200 grams per minute by ASTM D-1238 at 275° C. at the appropriate load, and preferably in the range of 0.1 to 150 grams per minute. Since the viscosity is highly shear sensitive, the compositions of the invention are well suited for extrusion applications.

The limits of effectiveness of some components of the compositions depend on the other components. For example, the lower limit of concentration of an effective adhering site, e.g., maleic anhydride, will probably be lower than a less effective adhering site, e.g., methacrylic acid. Similarly, the balance between amine and carboxyl end groups in the continuous phase will influence the comparative effectiveness of different adherent sites of the reactive polymer. Additional polymeric material may be present with the graft or block copolymer in the toughened thermoplastic composition, as long as such material is compatible with one or both of the components of the block or graft copolymer. It is similarly envisioned that combinations of more than one of the block or graft copolymers defined herein can be used.

The multiphase compositions of the present invention have a dispersed phase which is present in the form of particles located in the continuous phase. The particles have a weight average size in the range of 1 to about 100 microns, and preferably from 1.5 to about 40 microns, and most preferably from about 3.5 to about 15 microns. It is believed that the particle size may aid in the achievement of higher heat deflection temperature while maintaining or even improving the notched Izod values.

The process of the present invention eliminates dangers inherent in polymerization techniques and simplifies the equipment requirements since the coupling of polymer A and polymer B begins to form a graft and/or block polymer begins with polymers as starting products rather than with monomers. When, for example, a prior art copolymerization of monomers A and B is conducted, it requires special equipment, conditions, and/or techniques which are distinct from polymer melt processing methods. For example, polymerization vessels must be adapted to handle high pressures and temperatures and potentially hazardous conditions. In the present invention, melt processing methods are used to produce the impact modifiers as well as to blend the impact modifiers with the polyamide phase. Further, the melt processing equipment utilized is typical of that presently in use in the industry for compounding polyamides.

Moreover, since the impact modifiers are made beginning with polymers, the process allows considerable control over the structure of the block or graft copolymers. This is a distinct advantage over the processes which are limited to the production of random copolymers.

The compositions of the invention may be modified by one or more conventional additives such as stabilizers and inhibitors of oxidative, thermal, and ultraviolet degradation; lubricants and mold release agents; colorants including dyes and pigments; fibrous and particulate fillers and reinforcements; nucleating agents, plasticizers; etc. These additives can be incorporated at any stage in the preparation of the thermoplastic composition as is appropriate for the particular additive, i.e., additives which will react with the free radical, such as antioxidants, should not be added in the first step as is well known in the art.

The oxidative and thermal stabilizers useful in the materials of the present invention include those generally used in condensation polymers. They include, for example, up to 1 percent by weight, based on the weight of polyamide of Group I metal halides, e.g., sodium, potassium, lithium with cuprous halides, e.g., chloride, bromide, iodide, hindered phenols, hydroquinones, and varieties of substituted members of those groups and combinations thereof.

The ultraviolet light stabilizers, e.g., up to 2.0 percent, based on the weight of polyamide, can also be those generally used in condensation polymers. Examples of ultraviolet light stabilizes include various substituted resorcinols, salicylates, benzotriazoles, benzophenones, and the like.

Suitable lubricants and mold release agents, e.g., up to 1.0 percent, based on the weight of the composition, include stearic acid, stearic alcohol, stearamides; organic dyes such as nigrosine, etc.; pigments, e.g., titanium dioxide, cadmium sulfide, cadmium sulfide selenite, phthalocyanines, ultramarine blue, carbon black, etc.; up to 50 percent, based on the weight of the composition, of fibrous and particulate fillers and reinforcement, e.g., orqanic and inorganic fillers and fibers such as carbon fibers, glass fibers, polyamide fibers, boron fibers, Wollastonite fibers, and the like, amorphous silica, asbestos, calcium silicate, aluminum silicate, magnesium carbonate, kaolin, chalk, powdered quartz, mica, feldspar, etc.; nucleating agents, e.g., talc, calcium fluoride, sodium phenyl phosphinate, alumina, and finely divided polytetrafluoroethylene, etc.; plasticizers, up to about 20 percent, based on the weight of the composition, e.g., dioctyl phthalate, dibenzyl phthalate, butyl benzyl phthalate, hydrocarbon oils, N-normal butyl benzene sulfonamide, ortho and para toluene ethyl sulfonamide, etc. The colorants (dyes and pigments) can be present in an amount of up to about 5.0 percent by weight, based on the weight of the composition.

It may be desirable to form a concentrate of the toughened blend composition. This is accomplished by initially melt blending high amounts of the impact modifier to achieve a high concentration of the same in the polyamide composition. At a later point in time, additional polyamide can be melt blended therewith to yield a reduced concentration of the impact modifier.

It may be useful to increase the molecular weight of the toughened thermoplastic compositions during the preparation of the composition. By way of illustration, an admixture of low molecular weight polyamide, e.g., 5,000 to 15,000, and at least one impact modifying polymer is prepared in a plasticating device as described above and the molecular weight is increased either in the melt or at an elevated temperature below the melting point (solid phase) of the polyamide. By way of illustration, after melt blending the composition is either (1) held in the melt at a temperature about 20° to 40° C. above the melting point at a pressure of about 1 to 25 mm Hg absolute for up to one hour, or (2) in the solid phase, after cutting, quenching and drying, at an elevated temperature at least 15° C. below the melt temperature of the polyamide in an inert gas stream for at least two hours. Beaton U.S. Pat. No. 3,821,171 describes solid phase polymerization.

The blend compositions can be made into a wide range of useful articles by conventional molding methods employed in the fabrication of thermoplastic articles, i.e., as molded parts or extruded shapes, e.g., tubing, films, sheets, fibers and oriented fibers, laminates and wire coating. "Molding" means forming an article by deforming the blend in the heated plastic state. The compositions can be used for intricate structures since they have good flow characteristics. They can also be used for outdoor applications since they have good impact strength over a wide temperature range.

The compositions of this invention are characterized by an outstanding combination of properties, such as superior toughness properties in view of the quantity of the block or graft copolymer present in the polyamide matrix. The unusually high toughness provides greater ductility, less sensitivity to scratches and molded-in notches, and vastly reduced susceptibility to catastrophic failure when compared with previously known compositions in molded parts. Injection molded parts often are of varying thicknesses and may have scratches, molded-in notches of varying radii, and molded in stresses. In addition, orientation effects may cause varied ductility throughout a molded part. The maintenance of high uniform values of notched Izod toughness throughout such molded parts characterizes the improved compositions resistance to brittle breaks. The compositions are of sufficient toughness that the effect of minor changes in processing conditions will not cause significant variation in toughness from lot-to-lot quantities of composition. The compositions also have high heat deflection temperatures.

The following examples are provided to illustrate various polyamide alloy compositions prepared or derived in accordance with the present invention with such polymeric materials as described above. Again, it is emphasized that these examples are provided for illustrative purposes only and are not to serve as a limitation on the scope of the invention.

EXAMPLES

The following examples illustrate the invention wherein the percentages are by weight unless otherwise indicated.

The toughened polyamide compositions were prepared as follows:

The polyamide matrix and polymer(s) were mixed in dry form after weighing in the proper proportions by tumbling in a polyethylene bag. The mixture is then blended in a twin screw extruder. Molded samples of the polyamide compositions of the present invention were tested using the following test procedures in the dry-as-molded state (without annealing):

Notched Izod toughness at each end of the specimen° ASTM D-256-56

Tensile Strength° ASTM D-638-58T

Elongation. ASTM D-608-58T

Flexural Modulus° ASTM D-79-58T

Tensile Modulus of the matrices ASTM D-638-58T (dry)

Tensile Modulus of the polymers ASTM D-882 (50% RH)

Melt Flow ASTM D-1238-73 Condition G except where noted)

Particle Size Electron micrographs of cryogenic ultra-microtomed or fractured surfaces.

Heat Deflection Temperature ASTM D648-82 (264 psi)

The following examples illustrate the first step of the process in which the block or graft copolymers is made as well as the second step in which the block or graft copolymers are added to the polyamide to make the blend compositions of the present invention.

Determination of the extent of reaction between the elastomer and functionalized polymer was made using selective solvent extraction. This extraction technique utilizes a solvent that dissolves only one of the above-mentioned polymers. When a mixture of the two polymers is subjected to the solvent for a long period of time and the polymers are separated, it can be concluded that no reaction between the two polymers occurred. If this solvent is unable to dissolve completely off the mixture of the two polymers, this partial solubility is an indication of reaction between the two polymers.

EXAMPLE 1

EPDM (Vistalon-3708) and a terpolymer of ethylene, an alkylacrylate, and maleic anhydride (Lotader sold by C.D.F. Chemie) were melt mixed at varying proportions in a Banbury mixer at shear rates of 1200 to 1500 for five minutes at 360° F. The compositional variations are provided in Table I. Otherwise, the processes used have been previously discussed.

EXAMPLE 2

EPDM (Vistalon-3708) and a terpolymer of ethylene, alkylacrylate, maleic anhydride were melt mixed using FCM-CP-23 internal mixer with residence time of 70 seconds at 450° F. at shear rates of 1000 to 1500 sec$^{-1}$. The compositional variations are provided in Table II.

EXAMPLE 3

A graft or block copolymer was prepared using EPDM Vistalon-3708) and a copolymer of ethylene-acrylic acid and were mixed in a Banbury mixer in the presence of dicumyl peroxide (note Table III) according to the method described for Example 1.

EXAMPLE 4

Kraton D 1111 or Kraton G-1702 sold by Shell Chemical Co. and maleated Kraton G (Kraton G - 1901 Fx sold by Shell Chemical Co.) were mixed with and without dicumyl peroxide in a Banbury mixer at 250°-260° F. at shear rates of 1200 to 1500 for seven minutes (note Table IV.)

EXAMPLE 5

Kraton G-1702 and Primacor (ethylene-acrylic acid copolymer sold by Dow Chemical Co.) were melt mixed with and without dicumyl peroxide in a Banbury mixer at 250°-260° F. for 7 minutes at a shear rate of 1200 to 1500 (Note Table V).

EXAMPLE 6

Preparation of Nylon/Impact Modifier Blends

Nylon 66 was melt-mixed with the impact modifiers listed in Tables I to V using a twin screw extruder counter rotating Leistirtiz at shear rates of 100 to 600 sec$^-$and processing temperatures of 516+ to 540° F. with L/D of 24/1 and having a vacuum vent at zone 59.

The resulting molten materials were then cooled and pelletized. The material was injection molded using typical molding conditions for pure Nylon 66 with higher injection pressure than those of pure Nylon 66 material (note Samples 1 to 15 and 17 to 34 of Table VI).

EXAMPLE 7

Nylon 6 was melt mixed the same way as described in Example 6 with the above impact modifiers. Note Table VII for mechanical properties of these alloys.

EXAMPLE 8

Nylon 66 was melt mixed with impact modifier M using FCM-CP-23 melt mixing equipment. The mechanical properties are provided and compared with Samples 16 and 17 of Table VI.

EXAMPLE 9

Nylon 66 was melt mixed with impact modifier M and using the preparation method of Example 6. The concentration of M was varied from 5 to 95 percent by weight with Nylon 66 concentration (Note Table VIII).

TABLE I

| Modifier | EPDM Wt. %* | Ter-polymer Wt. %$^1$ | Peroxide (phr)$^2$ | Ter-polymer Wt. %$^3$ | Processing Equipment |
|---|---|---|---|---|---|
| A | 50 | — | 0.1 | 50 | Banbury |
| B | 80 | — | 0.1 | 20 | " |
| C | 90 | — | 0.1 | 10 | " |
| D | 80 | — | — | 20 | " |
| E | 70 | — | 0.1 | 30 | " |
| F | 60 | — | 0.1 | 40 | " |
| G | 50 | — | 0.1 | 50 | " |
| H | 40 | — | 0.1 | 60 | " |
| I | 30 | — | 0.1 | 70 | " |
| J | 60 | — | — | 40 | " |
| K | 80 | 20 | — | — | " |
| L | 80 | 20 | 0.1 | — | " |

*EPDM (Vistalon-3708) is available from Exxon Chemical Company
$^1$Terpolymer is Lotader-LX-4110 (ethylene-butyl acrylate-maleic anhydride terpolymer)
$^2$Peroxide is dicumyl peroxide
$^3$Terpolymer is Lotader-HX-8020 (ethylene-ethyl acrylate-maleic anhydride terpolymer)
Lotader terpolymers are available from C. d. F. Chemie

TABLE II

| Modifier | EPDM Wt. % | Ter-polymer Wt. % | Peroxide (phr) | Type of Peroxide | Processing Equipment |
|---|---|---|---|---|---|
| M | 80 | 20 | 0.1 | Dicumyl Peroxide | FCM |
| N | 80 | 20 | 0.02 | Dicumyl Peroxide | FCM |
| O | 80 | 20 | 0.04 | Dicumyl Peroxide | FCM |
| P | 80 | 20 | 0.06 | Dicumyl Peroxide | FCM |
| Q | 80 | 20 | 0.08 | Dicumyl Peroxide | FCM |
| R | 80 | 20 | 0.3 | VolCup-R | FCM |
| S | 80 | 20 | 0.5 | VolCup-R | FCM |

$^1$VolCup-R is a peroxide sold by Hercules which is alpha. alpha'-bis(tert-butylperoxy)-diisopropylbenzene

TABLE III

| Modifier | EPDM Wt. % | Co-polymer Wt. %* | Peroxide (phr) | Type of Peroxide | Processing Equipment |
|---|---|---|---|---|---|
| T | 80 | 20 | — | — | Banbury |
| U | 80 | 20 | 0.1 | Dicumyl | " |

TABLE III-continued

| Modifier | EPDM Wt. % | Co-polymer Wt. %* | Peroxide (phr) | Type of Peroxide | Processing Equipment |
|---|---|---|---|---|---|
| | | | | Peroxide | |

*Primacor-1420, sold by Dow Chemical Company

TABLE V

| Impact Modifier | Kraton G Wt. % | Primacor-1420 Wt. % | Peroxide (PHR) | Processing Equipment |
|---|---|---|---|---|
| Z | 50 | 50 | — | Banbury |
| AA | 50 | 50 | 0.1 | " |

TABLE VI

| | 1 | 2 | 3 | 4 | 5 | Control 6[a] | 7 | 8 | 9 | 10 | 11 | 12 |
|---|---|---|---|---|---|---|---|---|---|---|---|---|
| Nylon 66 | 80 | 80 | 80 | 80 | 80 | 75 | 80 | 80 | 80 | 80 | 80 | 80 |
| Impact Modifier | A | B | C | D | E | a | F | G | H | I | J | K |
| Wt. % of Modifier | 20 | 20 | 20 | 20 | 20 | 25 | 20 | 20 | 20 | 20 | 20 | 20 |
| Tensile Strength (psi) | 7600 | 7400 | 7100 | 7500 | 7700 | 6900 | 7700 | 7600 | 7900 | 7700 | 7800 | 7600 |
| Elongation to yield (%) | 8.6 | 7.2 | 7.0 | 7.3 | 7.1 | 6 | 7.3 | 7.4 | 7.6 | 7.8 | 7.6 | 7.2 |
| Elongation to Break (%) | 38 | 27 | 51 | 42 | 27 | 50 | 26 | 35 | 39 | 35 | 27 | 29 |
| Flexural Strength (psi) | 12100 | 11800 | 11700 | 11900 | 12300 | 10500 | 12100 | 12000 | 12400 | 12000 | 12100 | 11900 |
| Flexural Modulus (ksi) | 311 | 307 | 310 | 310 | 310 | 265 | 310 | 310 | 320 | 310 | 310 | 310 |
| Notched Izod Impact (⅛") | | | | | | | | | | | | |
| at 73° F. (ft. lb./in) | 13.0 | 13.0 | 3.0 | 2.2 | 11.4 | 7.8 | 12.0 | 12.0 | 3.6 | 11.0 | 11.0 | 12 |
| at −40° F. (ft. lb./in.) | 1.17 | 1.9 | — | — | 1.6 | 1.1 | 1.6 | 1.6 | — | 1.4 | 1.8 | 1.9 |
| Gardner Impact (in. lb.) | >320 | >320 | 224 | >320 | 246 | 300 | >320 | >316 | >316 | >316 | >316 | >316 |
| Heat Deflection Temperature at 264 psi (°C.) | 62 | 64 | 68 | 70 | 71 | 59 | 70 | 68 | 71 | 70 | 72 | 72 |

| | 13[b] | 14[b] | 15[b] | 16[b] | 17[c] | 18[c] | 19 | 20 | 21 | 22 | 23 | 24 |
|---|---|---|---|---|---|---|---|---|---|---|---|---|
| Nylon 66 | 80 | 82.4 | 80 | 77.6 | 77.6 | 77.6 | 77.6 | 80 | 77.6 | 77.6 | 77.6 | 82.4 |
| Impact Modifier | L | M | M | M | M | N | O | P | P | Q | R | S |
| Wt. % of Modifier | 20 | 17.6 | 20 | 22.4 | 22.4 | 22.4 | 22.4 | 20 | 22.4 | 22.4 | 22.4 | 17.6 |
| Tensile Strength (psi) | 7400 | 7960 | 7710 | 7090 | 6570 | 7210 | 7440 | 7730 | 7080 | 6700 | 7450 | 7650 |
| Elongation to yield (%) | 7.1 | 8.8 | 8.7 | 8.7 | 7.7 | 8.0 | 7.9 | 7.8 | 7.9 | 7.7 | 8.1 | 7.8 |
| Elongation to Break (%) | 40 | 34 | 31 | 35 | 72 | 41 | 38 | 33 | 37 | 40 | 37 | 59 |
| Flexural Strength (psi) | 12000 | 13190 | 12690 | 11670 | 10530 | 10770 | 11260 | 11500 | 10600 | 10680 | 10700 | 10720 |
| Flexural Modulus (ksi) | 300 | 318 | 302 | 289 | 280 | 278 | 295 | 299 | 278 | 285 | 272 | 309 |
| Notched Izod Impact (⅛") | | | | | | | | | | | | |
| at 73° F. (ft. lb./in) | 14 | 3.6 | 4.4 | 8.8 | 11.9 | 9.8 | 9.3 | 9.5 | 12.2 | 13.2 | 10.2 | 9.6 |
| at −40° F. (ft. lb./in.) | 2.1 | — | — | — | 2.4 | 2.5 | 2.9 | 2.5 | 2.7 | 2.7 | 2.6 | 2.3 |
| Gardner Impact (in. lb.) | >320 | >320 | >320 | >320 | >320 | >320 | >320 | >320 | >320 | >320 | >320 | >320 |
| Heat Deflection Temperature at 264 psi (°C.) | 69 | 75 | 74 | 73 | 68 | 69 | 73 | 69 | 70 | 69 | 74 | 73 |

| | 25 | 26 | 27 | 28 | 29 | 30 | 31 | 32 | 33 | 34 |
|---|---|---|---|---|---|---|---|---|---|---|
| Nylon 66 | 80 | 77.6 | 80 | 80 | 80 | 80 | 80 | 80 | 80 | 80 |
| Impact Modifier | S | S | T | U | V | W | X | Y | Z | AA |
| Wt. % of Modifier | 20 | 22.4 | 20 | 20 | 20 | 20 | 20 | 20 | 20 | 20 |
| Tensile Strength (psi) | 7410 | 7130 | 7260 | 7000 | 7900 | 8020 | 8180 | 8260 | 7910 | 8090 |
| Elongation to yield (%) | 7.9 | 8.3 | 8.6 | 6.9 | 9.3 | 9.3 | 8.7 | 9.2 | 10.4 | 10.6 |
| Elongation to Break (%) | 47 | 42 | 60 | 70 | 32.2 | 33.0 | 24.5 | 26.4 | 48.8 | 56.5 |
| Flexural Strength (psi) | 11200 | 10550 | 11800 | 11600 | 12490 | 12640 | 13040 | 12990 | 12830 | 12770 |
| Flexural Modulus (ksi) | 294 | 271 | 319 | 308 | 303 | 310 | 316 | 320 | 312 | 307 |
| Notched Izod Impact (⅛") | | | | | | | | | | |
| at 73° F. (ft. lb./in) | 9.3 | 12.2 | 2.6 | 14.4 | 14.6 | 12.6 | 12.2 | 9.9 | 1.1 | 11.8 |
| at −40° F. (ft. lb./in.) | 2.5 | 2.6 | — | 2.6 | 1.6 | 1.7 | 2.0 | 1.6 | 0.8 | 1.6 |
| Gardner Impact (in. lb.) | >320 | >320 | >320 | >311 | ≧320 | >320 | >320 | >320 | >320 | >320 |
| Heat Deflection Temperature at 264 psi (°C.) | 72 | 68 | 63 | 49 | 66 | 66 | 67 | 65 | 66 | 65 |

[a] Pure (100%), Lotader-HX-8020
[b] Made by twin screw extruder (mild screw design)
[c] Made by FCM-CP-23

TABLE IV

| Impact Modifier | Kraton Wt. % | Kraton Type | Kraton G-FX-1901 Wt. % | Peroxide (PHR) | Processing Equipment |
|---|---|---|---|---|---|
| V | 50 | G | 50 | — | Banbury |
| W | 50 | G | 50 | 0.1 | " |
| X | 50 | D | 50 | — | " |
| Y | 50 | D | 50 | 0.1 | " |

Kraton G is hydrogenated triblock styrene-butadiene-styrene copolymer
Kraton D is nonhydrogenated triblock styrene-butadiene-styrene copolymer
The Kraton products are available from Shell Chemical Company

TABLE VII

| *Nylon 6 | 80 | 80 | 80 |
|---|---|---|---|
| Impact Modifier | M | T | U |
| Wt. % of Impact Modifier | 20 | 20 | 20 |
| Tensile Strength (psi) | 7370 | 7300 | 7300 |
| Elongation to yield (%) | 6.9 | 7.0 | 7.0 |
| Elongation to Break (%) | 62 | 30 | 60 |
| Flexural Strength (psi) | 11000 | 11600 | 11100 |
| Flexural Modulus (ksi) | 270 | 303 | 294 |
| Notched Izod Impact (⅛") | | | |
| at 73° F. (ft. lb./in) | 13.2 | 15 | 16 |
| at −40° F. (ft. lb./in.) | 2.5 | 2.9 | 3.1 |
| Gardner Impact (in. lb.) | >320 | >320 | >307 |
| Heat Deflection Temperature at 264 psi (°C.) | 56 | 48 | 46 |

*Nylon 6 is Capron-8200HS sold by Allied Chemical Corp.

TABLE VIII

| | 1 | 2 | 3 | 4 | 5 | 6 | 7 | 8 | 9 |
|---|---|---|---|---|---|---|---|---|---|
| FORMULATIONS | | | | | | | | | |
| Nylon 66 (Zytel 101) | 95.00% | 90.00% | 85.00% | 80.00% | 77.60% | 75.00% | 70.00% | 60.00% | 50.00% |
| Impact Modifier (M) | 5.00% | 10.00% | 15.00% | 20.00% | 22.40% | 25.00% | 30.00% | 40.00% | 50.00% |
| TEST RESULTS: | | | | | | | | | |
| Melt Index (g/10 min.) 275° C./10,000 g | 280.8 | 292.8 | 234.4 | 214.8 | 186.0 | 148.8 | 119.6 | 22.1 | 5.9 |
| Melt Index (g/10 min.) 275° C./325 g | 7.4 | 6.0 | 3.8 | 2.9 | 1.6 | 1.0 | 1.3 | 0 | 0 |
| Tensile | | | | | | | | | |
| Yield Strength (psi) | 10800 | 9600 | 8500 | 7400 | 6900 | 6300 | 5800 | 4600 | 3000 |
| Yield Strain (%) | 8.9 | 8.4 | 8.0 | 7.9 | 7.8 | 7.9 | 8.1 | 10.3 | 15.8 |
| Break Strain (%) | 44 | 43 | 36 | 47 | 46 | 57 | 54 | 102 | 104 |
| Flexural | | | | | | | | | |
| Strength (psi) | 17000 | 15100 | 13700 | 11800 | 11200 | 10000 | 9000 | 6800 | 4900 |
| Modulus ($10^5$ psi) | 4.18 | 3.74 | 3.14 | 3.02 | 2.80 | 2.55 | 2.25 | 1.76 | 1.26 |
| Izod Impact | | | | | | | | | |
| Notched ⅛" (ftlb/in) | 1.8C | 1.7C | 2.4C | 4.3C | 12.0NB | 15.0NB | 16.5NB | 18.2NB | NB |
| Notched ⅛" −40° C. | 1.2C | 1.4C | 1.7C | 2.1C | 2.1C | 2.5C | 3.1C | 6.0C | NB |
| Gardner Impact (in. lb) | 313 ± 3 | >320 | >320 | >320 | >320 | >320 | >320 | >320 | >320 |
| Gardner Impact (−40° C.) | 278 ± 39 | 313 ± 3 | >320 | >320 | 316 ± .4 | >320 | >320 | >320 | 261 ± 166 |
| Heat Distortion | | | | | | | | | |
| 264 psi (°C.) | 71 | 72 | 71 | 71 | 66 | 67 | 64 | 60 | 50 |
| 66 psi (°C.) | 226 ± 6 | 221 | 202 ± 3 | 205 | 200 | 183 | 166 ± 12 | 124 ± 5 | 87 |
| Brittleness Temp. (°C.) | <−40 | <−40 | <−40 | <−40 | <−40 | <−40 | <−40 | <−40 | <−40 |

| | 10 | 11 | 12 | 13 | 14 |
|---|---|---|---|---|---|
| FORMULATIONS | | | | | |
| Nylon 66 (Zytel 101) | 40.00% | 30.00% | 20.00% | 10.00% | 5.00% |
| Impact Modifier (M) | 60.00% | 70.00% | 80.00% | 90.00% | 95.00% |
| TEST RESULTS: | | | | | |
| Melt Index (g/10 min.) 275° C./10,000 g | 6.6 | 4.2 | 6.9 | 11.6 | 15.3 |
| Melt Index (g/10 min.) 275° C./325 g | 0 | 0 | 0.02 | 0.03 | 0.04 |
| Tensile | | | | | |
| Yield Strength (psi) | 2100 | 800 | 300 | 290 | 270 |
| Yield Strain (%) | 17.3 | 22.7 | 84.8 | 99.5 | 102.3 |
| Break Strain (%) | 105 | 170 | 658 | 1358 | 1574 |
| Flexural | | | | | |
| Strength (psi) | 2800 | 900 | 200 | 150 | 170 |
| Modulus ($10^5$ psi) | 0.69 | 0.18 | 0.024 | 0.021 | 0.020 |
| Izod Impact | | | | | |
| Notched ⅛" (ftlb/in) | NB | NB | NB | NB | NB |
| Notched ⅛" −40° C. | NB | NB | NB | NB | NB |
| Gardner Impact (in. lb) | 233 ± 12 | >320 | >320 | >320 | >320 |
| Gardner Impact (−40° C.) | 273 ± 123 | 176 ± 9 | 182 ± 5 | 140 ± 6 | 127 ± 12 |
| Heat Distortion | | | | | |
| 264 psi (°C.) | 53 | ** | ** | ** | ** |
| 66 psi (°C.) | 70 | 55 | ** | ** | ** |
| Brittleness Temp. (°C.) | <−40 | <−40 | <−40 | <−40 | <−40 |

Zytel 101 is sold by DuPont DeNemours Corp.
**Could not test

The data set forth in the foregoing tables show physical properties for polyamide blends made in accordance with the invention using Nylon 6 and Nylon 66 as the polyamides, and a variety of block or graft copolymers.

The data presented in Table VI show the effect of concentration of reactive polymer component in the impact modifier as prepared according to the compositional variations presented in Table I (i.e., impact modifiers A to J) with respect to the notched Izod impact strength of the final nylon blends. Formulations 1 to 11 are representative of the above variations. It is evident that for most applications 20 to 60 percent by weight of reactive polymer in the impact modifier is preferred. At very high concentrations of the reactive polymer, in this case Lotader HX-8020, very high shear mixing is sufficient to achieve high impact properties. At the lower concentration of the reactive polymer, the use of both free radical initiator and high shear mixing is required.

Formulations 1 and 8 are provided to show the reproducibility of the above examples. Formulations 7 and 11 are provided to show high shear mixing is sufficient to generate block and/or graft copolymer of rubber and reactive polymer at higher concentrations of reactive polymer. Formulations 2 and 4 are provided to show a free radical initiator is needed in addition to high shear mixing to generate sufficient amount of block and/or graft copolymer of rubber and reactive polymer at lower concentrations of reactive polymer.

Formulations 12 and 13 are provided to demonstrate the desirability of combining peroxide and higher shear mixing to enhance the formation of the block and/or graft copolymer when preparing the blend from nylon. This is demonstrated by higher room temperature and minus 40° C. impact strength of Formulation 13 over Formulation 12.

Formulations 13 and 15 are provided to show the effect of processing equipment used to make impact modifiers on the resulting toughened nylon materials. The impact modifier (L) used for Formulation 13 was prepared using melt mixing equipment, i.e., a Banbury mixer, which operates at higher shear rates and residence time than the FCM-CP 23 equipment. Impact modifier (M) was made in FMC-CP-23 to compare with impact modifier (L). As is evident, impact modifier (M) in Formulation 15 is not as effective as (L) in Formulation 13, since a larger amount of it is required to make a nylon alloy with sufficient toughness.

Formulations 15, 16 and 17 demonstrate the effect of shear rate on Nylon 66 and impact modifier M. In the preparation of Formulation 16, a twin screw extruder was shown to be less effective than FCM-CP-23 which was used to prepare Formulation 17. Formulations 17, 18, 19, 20, 21 and 22 are provided to demonstrate the effect of peroxide concentration on the mechanical properties of nylon impact modified product. As the concentration of peroxide increases, the impact properties of the resulted products at room temperature increases. Formulations 22, 23, 24 and 25 are provided to demonstrate the effect of the type of peroxide and its concentration on the mechanical properties. It is demonstrated that VulCup-R may also be used as the free radical generator. Formulations 27, 28, 33 and 34 are provided to demonstrate the desirability of using peroxide in order to prepare a sufficient impact modifier for nylon. Formulations 29, 30, 31 and 32 are provided to show that the use of a chemical free radical generator may not always be needed. High shear rate mixing is sufficient in some cases to make a useful impact modifier for nylon.

In Table VII the use of Nylon 6 instead of Nylon 66 was studied, where the impact modification was achieved using the same approach as previously. In this case, the use of peroxide in addition to high shear mixing was found to be more beneficial. Table VIII shows the effect of varying the compositional range of the Nylon 66 versus the impact modifier. As expected, the increase of impact modifiers' concentration enhances the impact resistance of the resultant blend.

While in accordance with the Patent Statutes, the best mode and preferred embodiment has been set forth, the scope of the invention is not limited thereto, but rather by the scope of the attached claims.

What is claimed is:

1. A multiphase composition which is a reaction product formed by mixing Nylon 66 and a block or graft copolymer, said mixing step being a melt blending or a dry mixing followed by melt mixing at a temperature at from about 400° F. to about 650° F. and at a shear rate from about 500 sec$^{-1}$ to about 2000 sec$^{-1}$ and comprising:

from about 5 to about 95 percent by weight of said polyamide, from about 5 to about 95 percent by weight of said block or graft copolymer which is formed by mixing at a reaction temperature of from about 200° to about 500° F. and at a shear rate of from about 500 sec$^{-1}$ to about 2,000 sec$^{-1}$ in the presence of free radicals so as to cause a chemical coupling of at least a first and second polymer components, said first polymer component comprising one or more rubber polymers and said second polymer component comprising one or more reactive polymers having a reactive functionality reactive with said polyamide, said reactive polymer having a mole fraction of less than 0.5 of said reactive functionality, said reactive functionality being selected from the group consisting of an unsaturated dicarboxylic acid, an unsaturated monocarboxylic acid, an anhydride of a dicarboxylic acid, a monoester, a sulfonic acid, and an epoxy, or said reactive polymer having a salt of said reactive functionality; said rubber containing unsaturation and having a glass transition temperature of minus 40° C. or less or an elongation of 100 percent or greater at room temperature and comprising at least one of said polymers or copolymers made from one or more of butadiene, ethylene propylene diene monomer, isoprene, and neoprene; or at least one of polymers or copolymers of halogenated unsaturated rubber, polyisoprene, nitrile rubbers, unsaturated polyurethane rubber, unsaturated polyester rubbers, and unsaturated block copolymers.

2. A composition as set forth in claim 1, wherein the composition is a at least a two-phase composition having a continuous phase and a dispersed phase, wherein said Nylon 66 comprises the continuous phase and the block or graft copolymer comprises the dispersed phase, and said dispersed phase is present in the form of particles having a weight average particle size of from 1 to about 100 microns.

3. A composition as set forth in claim 2, wherein the composition has a notched Izod value of at least of 2 ft-lbs/inch.

4. A composition as set forth in claim 3, wherein the composition comprises from about 30 to about 85 percent by weight of the polymers of the Nylon 66.

5. A composition as set forth in claim 6, wherein said composition comprises from about 40 to about 80 percent by weight of the polymers of the Nylon 66.

6. A composition as set forth in claim 7, wherein said composition has a notched Izod value of at least 4 ft-lbs/inch.

7. A composition as set forth in claim 6, wherein said reactive functionality is selected from the group consisting of dicarboxylic acid groups and salts thereof, sulphonic acid groups, and salts thereof, and epoxy.

8. A composition as set forth in claim 7, wherein said Nylon 66 is a semi-crystalline or amorphous resin and is produced by the reaction of approximately equimolar amounts of at least one dicarboxylic acid and at least one diamine.

9. The composition according to claim 8, wherein a molded article produced from said polymer composition has a notched Izod of at least 9 ft-lb/inch at 23° C. and at least about 3.0 ft-lb/inch at minus 40° C.

10. The polymer according to claim 9, wherein said dispersed phase has a weight average particle size of from about 1.5 to about 40 microns.

11. The polymer according to claim 10, wherein said dispersed phase has a weight average particle size of from about 3.5 to about 15 microns.

12. The polymer according to claim 11, wherein said reactive polymer has an ethylene unit therein.

13. A composition as set forth in claim 12 wherein said block or graft copolymer is formed by mixing said one or more rubber polymers and said one or more reactive polymers in the presence of high shear.

14. A composition as set forth in claim 13 wherein said mixing takes place at shear rates of from about 500 to about 2,000 sec$^{-1}$.

15. A composition as set forth in claim 1 wherein said block or graft copolymer is in the form of an extrudate.

16. A composition as set forth in claim 1 wherein said rubber is made from one or more diene monomers or from one or more nitrile monomers.

* * * * *